United States Patent
Rutter et al.

(10) Patent No.: US 6,270,888 B1
(45) Date of Patent: Aug. 7, 2001

(54) POLYMERIC FILM

(75) Inventors: Philip Mark Rutter; Allan Lovatt, both of Cleveland (GB)

(73) Assignee: Dupont Teijin Films US Limited Partner, Wilmington, DE (US)

( * ) Notice: Subject to any disclaimer, the term of this patent is extended or adjusted under 35 U.S.C. 154(b) by 0 days.

(21) Appl. No.: 09/242,246
(22) PCT Filed: Aug. 7, 1997
(86) PCT No.: PCT/GB97/02105
§ 371 Date: Jan. 7, 2000
§ 102(e) Date: Jan. 7, 2000
(87) PCT Pub. No.: WO98/06575
PCT Pub. Date: Feb. 19, 1998

(51) Int. Cl.[7] .............. B32B 27/06; B32B 27/18; B32B 27/36
(52) U.S. Cl. .............. 428/347; 428/35.8; 428/35.9; 428/212; 428/343; 428/346; 428/349; 428/480; 428/458
(58) Field of Search .................. 428/35.8, 35.9, 428/480, 457, 458, 910, 212, 343, 346, 347, 349

(56) References Cited

U.S. PATENT DOCUMENTS

| | | | |
|---|---|---|---|
| 3,244,708 | 4/1966 | Duennenberger et al. | 260/248 |
| 3,843,371 | 10/1974 | Piller et al. | 96/84 R |
| 4,446,262 | 5/1984 | Okumura et al. | 524/89 |
| 4,619,956 | 10/1986 | Susi | 524/87 |
| 4,681,905 | 7/1987 | Kubota et al. | 524/91 |
| 4,684,679 | 8/1987 | Kubota et al. | 524/91 |
| 4,812,498 | 3/1989 | Nakahara et al. | 524/91 |
| 5,251,064 | 10/1993 | Tennant et al. | 359/361 |
| 5,264,539 | 11/1993 | Shepherd | 528/272 |
| 5,288,778 | 2/1994 | Schmitter et al. | 524/100 |
| 5,618,621 | * 4/1997 | Hasegawa et al. | 428/343 |
| 5,700,529 | * 12/1997 | Kobayashi et al. | 428/35.8 |
| 5,705,240 | * 1/1998 | Machii et al. | 428/35.9 |

FOREIGN PATENT DOCUMENTS

| | | |
|---|---|---|
| 0006686 | 1/1980 | (EP) . |
| 0031202 | 7/1981 | (EP) . |
| 0076582 | 4/1983 | (EP) . |
| 0031203 | 7/1991 | (EP) . |
| 0686501 | 12/1995 | (EP) . |
| WO 94/05645 | 3/1994 | (WO) . |

* cited by examiner

*Primary Examiner*—Vivian Chen
(74) *Attorney, Agent, or Firm*—Andrew G. Golian

(57) ABSTRACT

A polymeric film comprising a polyester film substrate comprising 0.1% to 10% by weight, relative to the weight of the polyester, of at least one UV absorber, and a heat sealable layer, wherein the substrate is a multilayer film having an outer substrate layer and an inner substrate layer, the inner substrate layer comprising 1% to 40% by weight of UV absorber, relative to the amount of UV absorber present in the outer substrate layer. The film is particularly suitable for use as a protective layer on a metal sheet.

1 Claim, 1 Drawing Sheet

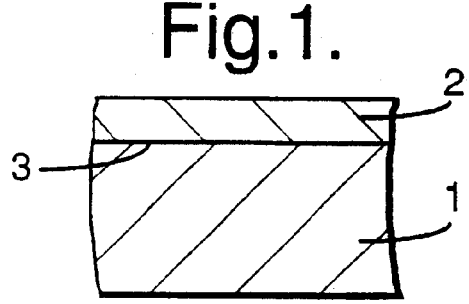
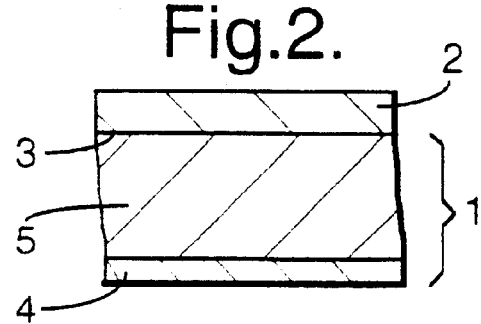
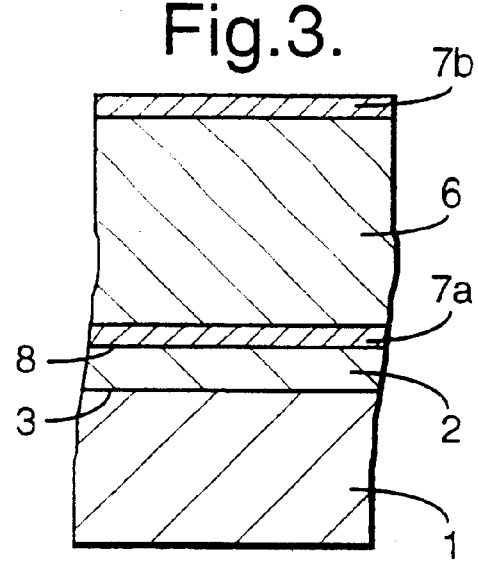

POLYMERIC FILM

This invention relates to a polymeric film, and in particular to a heat-sealable film which comprises an ultraviolet (UV) light absorber, and to a metal sheet comprising said film.

Metal sheet, in coil or plate form, needs to be coated with protective layers in order for it to possess adequate corrosion resistance. Generally paint layers, or polymeric films such as polyvinyl chloride (PVC), or a combination of the two have been used to coat metal sheet. Polymeric films have certain advantages over paint layers, such as hardness, weatherability and aesthetic appearance. Unfortunately, polymeric films can be difficult to bond to the primer-coated or painted metal sheet. In addition, for certain applications of coated metal sheet, polymeric films may possess insufficient weatherability, particularly when metal sheet is exposed to sunlight, eg when used as external cladding for buildings.

Polyester films generally exhibit a lack of stability to UV radiation. This lack of stability manifests itself in a yellowing, hazing and cracking of the polyester film on exposure to sunlight, which has limited the potential uses of the film in an outdoor environment.

It is known to increase the stability of polymers, such as polyester to UV light by the incorporation therein of a UV absorbing material. A UV absorber has an extinction coefficient much higher than that of the relevant polymer such that most of the incident UV light is absorbed by the UV absorber instead of by the polymer. The UV absorber generally dissipates the absorbed energy as heat, ie does not result in degradation of the polymer chain, with consequent increase in the stability of the polymer to UV light.

Some UV absorbers are actually degraded by UV light which results in a reduction of effect over time. In addition, some UV absorbers have relatively high volatility and/or thermally degrade which can cause problems including reduction in effectiveness, particularly when incorporated into a polymer for making film.

We have now devised a polymeric film and a laminated metal sheet which reduces or overcomes at least one of the aforementioned problems.

SUMMARY OF INVENTION

Accordingly, the present invention provides a polymeric film comprising a polyester film substrate comprising in the range from 0.1% to 10% by weight, relative to the weight of the polyester, of at least one UV absorber, and a heat-sealable layer on a surface of the substrate.

The invention also provides a method of producing a polymeric film which comprises forming a substrate by extruding a layer of molten polyester comprising in the range from 0.1% to 10% by weight, relative to the weight of the polyester, of at least one UV absorber, quenching the extrudate, orienting the quenched extrudate in at least one direction, and forming a heat-sealable layer on a surface of the substrate.

The invention further provides a use of a polymeric film comprising a polyester film substrate comprising in the range from 0.1% to 10% by weight, relative to the weight of the polyester, of at least one UV absorber, and a heat-sealable layer on a surface of the substrate, as a protective coating layer on a metal sheet.

The invention still further provides a laminated metal sheet comprising (i) a metal sheet, (ii) an optional primer layer, (iii) a paint layer, and (iv) a polymeric film comprising a polyester film substrate comprising in the range from 0.1% to 10% by weight, relative to the weight of the polyester, of at least one UV absorber, and a heat-sealable layer on a surface of the substrate, the heat-sealable layer being in contact with the paint layer.

The polyester film substrate is a self-supporting film by which is meant a self-supporting structure capable of independent existence in the absence of a supporting base.

A polyester suitable for use in the formation of a substrate layer is preferably a synthetic linear polyester and may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexane dimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838708.

The polyester substrate may be unoriented, or preferably oriented, for example uniaxially oriented, or more preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

In principle, any organic or inorganic UV absorber suitable for use in polyester may be employed in the present invention. Suitable examples include the organic UV absorbers disclosed in Encyclopaedia of Chemical Technology, Kirk-Othmer, Third Edition, John Wiley & Sons, Volume 23, Pages 615 to 627. Particular examples of UV absorbers include benzophenones, benzotriazoles (U.S. Pat. Nos. 4,684,679, 4,812,498 and 4,681,905), benzoxazinones (U.S. Pat. Nos. 4,446,262, 5,251,064 and 5,264,539) and triazines (U.S. Pat. Nos. 3,244,708, 3,843,371, 4,619, 956, 5,288,778 and WO 94/05645). The teaching of the aforementioned patent specifications is incorporated herein by reference.

In one embodiment of the invention, the UV absorber may be chemically incorporated in the polyester chain. Preferred UV stable polyesters are produced by incorporating benzophenones in to the polyester, for example as described in EP-A-0006686, EP-A-0031202, EP-A-0031203 and EP-A-0076582, the teaching of which is incorporated herein by reference.

Triazines are preferred UV absorbers, more preferably hydroxyphenyltriazines, and particularly hydroxyphenyltriazine compounds of Formula 1

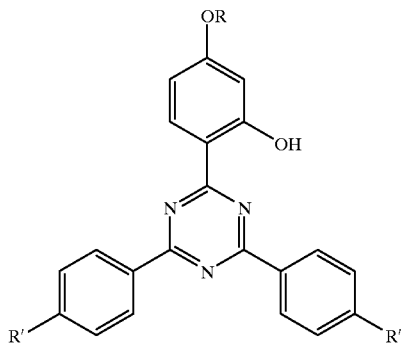

wherein R is hydrogen, $C_1$–$C_{18}$ alkyl, $C_2$–$C_6$ alkyl substituted by halogen or by $C_1$–$C_{12}$ alkoxy, or is benzyl and R' is hydrogen or methyl. R is preferably $C_1$–$C_{12}$ alkyl or benzyl, more preferably $C_3$–$C_6$ alkyl, and particularly hexyl. R' is preferably hydrogen. An especially preferred UV absorber is 2-(4,6-diphenyl-1,3,5-triazin-2-yl)-5-(hexyl)oxyphenol, which is commercially available as Tinuvin 1577 FF from Ciba-Additives.

Suitable inorganic UV absorbers include metal oxide particles, such as zinc oxide or titanium dioxide, having a mean crystal size, as determined by electron microscopy, of less than 200 nm, more preferably in the range from 5 to 150 nm, particularly 10 to 100 nm, and especially 15 to 40 nm. Titanium dioxide particles are particularly preferred.

The titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as using the chloride process or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

Suitable titanium dioxide particles are commercially available, for example "Tiosorb" ultra-fine titanium dioxide particles from Tioxide, UK.

The amount of UV absorber present in the polyester substrate is preferably in the range from 0.2% to 7%, more preferably 0.6% to 4%, particularly 0.8% to 2%, and especially 0.9% to 1.2% by weight, relative to the weight of the polyester.

In one embodiment of the invention, both an organic UV absorber, preferably a triazine, and an inorganic UV absorber, preferably titanium dioxide, are present in the polyester substrate. The ratio, by weight, of inorganic to organic UV absorber is preferably in the range from 0.5 to 10:1, more preferably 1 to 5:1, and particularly 1.5 to 2.5:1.

Particularly improved aesthetic appearance occurs when the external surface of the polyester substrate is matt, preferably exhibiting a 60° gloss value, measured as herein described, of less than 60%, more preferably in the range from 5% to 55%, particularly 20% to 50%, and especially 35% to 45%.

The external surface of the polyester substrate suitably exhibits a root mean square surface roughness (Rq), measured as herein described, of greater than 50, preferably in the range from 200 to 1500 nm, more preferably 400 to 1200 nm, and particularly 500 to 1000 nm.

The polymeric film is preferably transparent or translucent, preferably having a wide angle haze, being measured according to the standard ASTM D 1003-61, of <75%, more preferably in the range from 30% to 70%, particularly 40% to 65%, and especially 45% to 55%, suitably for a 30 µm thick film. In order to obtain the preferred properties of the polyester film substrate surface it is generally necessary to incorporate relatively small quantities of filler material therein. Suitable fillers include inorganic materials such as silica, china clay, glass, mica, calcium carbonate, and organic materials such as silicone resin particles. Spherical monodisperse fillers may be employed. Silica is a particularly preferred filler.

The concentration of filler particles present in the substrate is preferably in the range from 0.001% to 5%, more preferably 0.05% to 3%, particularly 0.5% to 2%, and especially 0.8% to 1.2% by weight, relative to the weight of the polyester.

The filler particles preferably have a volume distributed median particle diameter (equivalent spherical diameter corresponding to 50% of the volume of all the particles, read on the cumulative distribution curve relating volume % to the diameter of the particles—often referred to as the "D(v, 0.5)" value), as determined by laser diffraction, in the range from 0.3 to 20 µm, more preferably 1 to 10 µm, particularly 3 to 8 µm, and especially 5 to 7 µm.

Particle size of the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

The thickness of the polyester substrate may vary over a wide range but preferably is within the range from 5 to 300 µm, more preferably 10 to 100 µm, particularly 15 to 50 µm, and especially 20 to 30 µm.

The components of the substrate layer composition may be mixed together in conventional manner. For example, by mixing with the monomeric reactants from which the polyester is derived, or the components may be mixed with the polyester by tumble or dry blending or by compounding in an extruder, followed by cooling and, usually, commutation into granules or chips. The UV absorber may be fed separately to the extruder from which the polyester is extruded to form the substrate layer. Alternatively master batch technology may be employed.

The heat-sealable layer is preferably a polymeric coating layer which is capable of forming a heat-seal bond to itself and/or to the polyester substrate and/or to the metal sheet as described herein, by heating to soften the polymeric material of the heat-sealable layer and applying pressure without softening or melting the polyester material of the substrate layer. The heat-sealable layer preferably exhibits a heat-seal strength, measured by sealing the layer to itself, in the range from 200 to 3000, more preferably 300 to 1500, and particularly 350 to 500 $Nm^{-1}$.

In a preferred embodiment of the invention the heat-sealable layer suitably comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory properties are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate, and especially a copolyester of about 82 mole % ethylene terephthalate and about 18 mole % ethylene isophthalate.

The heat-sealable layer may be applied from an organic or aqueous solvent, to an already oriented polyester substrate, or more preferably before or during the stretching operation. Alternatively, the heat-sealable layer may be formed by casting the heat-sealable polymer onto a preformed substrate layer. Conveniently, however, formation of a composite sheet (substrate and heat-sealable layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a composite sheet.

A coextruded sheet is stretched to effect molecular orientation of the substrate, and preferably heat-set. Generally, the conditions applied for stretching the substrate layer will induce partial crystallisation of the heat-sealable polymer and it is therefore preferred to heat set under dimensional restraint at a temperature selected to develop the desired morphology of the heat-sealable layer. Thus, by effecting heat-setting at a temperature below the crystalline melting temperature of the heat-sealable polymer and permitting or causing the composite to cool, the heat-sealable polymer will remain essentially crystalline. However, by heat-setting at a temperature greater than the crystalline melting temperature of the heat-sealable polymer, the latter will be rendered essentially amorphous. Heat-setting of a composite sheet comprising a polyester substrate and a copolyester heat-sealable layer is conveniently effected at a temperature within a range of from 175 to 200° C. to yield a substantially crystalline heat-sealable layer, or from 200 to 250° C. to yield an essentially amorphous heat-sealable layer. An essentially amorphous heat-sealable layer is preferred.

The thickness of the heat-sealable layer may vary over a wide range but generally will not exceed 50 µm, and is preferably in the range from 0.5 to 30 µm, more preferably 2 to 15 µm, and particularly 3 to 10 µm.

In one embodiment of the present invention, the polyester film substrate is a multilayer film, preferably have two layers, a first outer layer, and a second inner layer in contact with the heat-sealable layer. The chemical composition of the outer and inner substrate layers is preferably the same, more preferably of polyethylene terephthalate. The ratio of the thickness of the outer layer to inner layer is preferably in the range from 0.02 to 1:1, more preferably 0.05 to 0.5:1, particularly 0.1 to 0.3:1, and especially 0.15 to 0.25:1.

The concentration of UV absorber present in the outer substrate layer is preferably in the range from 0.5% to 10%, more preferably 1% to 8%, particularly 3% to 7%, and especially 4% to 6% by weight, relative to the weight of the polyester. The inner substrate layer preferably comprises substantially no UV absorber or significantly smaller amounts of UV absorber than are present in the outer substrate layer. In a particular preferred embodiment of the present invention, the inner substrate layer comprises in the range from 1% to 40%, more preferably 3% to 25%, particularly 5% to 20%, and especially 10% to 15% by weight of UV absorber, relative to the amount of UV absorber present in the outer substrate layer. It is preferred that the same UV absorber(s) is present in both the outer and inner substrate layers.

The concentration of filler particles present in the outer substrate layer is preferably in the range from 0.001% to 5%, more preferably 0.05% to 3%, particularly 0.5% to 2%, and especially 0.8% to 1.2% by weight, relative to the weight of the polyester. The inner substrate layer preferably comprises substantially no filler particles or significantly smaller concentrations of filler than are present in the outer substrate layer.

A polymeric film comprising an outer polyester substrate layer/inner polyester substrate layer/heat-sealable layer is preferably formed by coextrusion as described herein.

The layers of a polymeric film according to the present invention may, if desired, contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, viscosity modifiers and dispersion stabilisers may be incorporated as appropriate.

The polymeric film according to the present invention is particularly suitable for use as a protective coating on a metal sheet, particularly when applied to the metal sheet on a coil coating line, for example as described in EP-0686501-A, the teaching of which is incorporated herein by reference. Suitable metal sheets include cold rolled steel, metatlised steel, stainless steel, galvanised steel, and aluminium etc.

The metal sheet may be chemically pretreated, eg by the known methods of chromating, pickling and phosphating, prior to the optional application of a standard primer coat. The thickness of the dried primer coat is preferably in the range from 2 to 30 µm, more preferably 5 to 20 µm.

A pigmented or non-pigmented paint layer can be applied either directly, or by means of the primer layer, to the metal sheet. Conventional paints may be used, such as acrylic, polyester, fluorocarbon dispersions, PVC-plastisols, vinyl or latex paints. The thickness of the dried paint layer is preferably in the range from 5 to 120 µm, more preferably 15 to 80 µm, particularly 25 to 60 µm, and especially 30 to 50 µm.

The primer or paint layer may be applied by conventional techniques such as doctor blade coating, roller coating, spray coating or curtain coating.

The polymeric film according to the present invention is adhered, by means of the heat-sealable layer, to the painted metal sheet by conventional laminating techniques, such as by using a pressure roller or calendering. The polymeric film is preferably applied directly to a hot paint surface, eg whereby the painted metal sheet has been heated in an oven at a temperature in the range from 200 to 230° C.

BRIEF DESCRIPTION OF DRAWINGS

The invention is illustrated by reference to the following drawings in which:

FIG. 1 is a schematic sectional elevation, not to scale, of a polymeric film having a polyester film substrate and a heat-sealable layer.

FIG. 2 is a similar schematic elevation of a film shown in FIG. 1, wherein the polyester film substrate is a two layer film having an outer layer and an inner layer.

FIG. 3 is a similar schematic elevation of a film shown in FIG. 1, bonded to a painted metal sheet.

Referring to FIG. 1 of the drawings, the polymeric film comprises a polyester film substrate (1) having a heat-sealable layer (2) bonded to a surface (3) of the substrate.

The film of FIG. 2 has a polyester film substrate (1) having two layers, an outer layer (4) and an inner layer (5) bonded to the heat-sealable layer (2).

The film of FIG. 3 additionally comprises a metal sheet (6) having painted outer layers (7a and 7b) bonded to the surface (8) of the heat-sealable layer (2).

In this specification the following test methods have been used to determine certain properties of the polymeric film:
(i) Wide angle haze was measured using a Hazegard System XL-211, according to ASTM D 1003-61.
(ii) 60° gloss value of the film surface was measured using a Dr Lange Reflectometer REFO 3 (obtained from Dr Bruno Lange, GmbH, Dusseldorf, Germany) according to DIN 67530.
(iii) The root mean square roughness (Rq) of the external surface of the polyester film substrate was measured using a Wyko Optical Profiler over a field of view of 0.9×1.2 mm.
(iv) Heat-seal strength was measured by positioning together and heating two heat-sealable layers present on polyester film substrate layers, at 140° C. for one second under a pressure of 275 kPa (40 psi). The sealed film was cooled to room temperature and the heat-seal strength determined by measuring the force required under linear tension per unit width of seal to peel the layers of the film apart at a constant speed of 4.23 mm/second.
(v) The polyester film was tested in an Atlas C165 Weatherometer under the following conditions—automatic irradiate of 0.35 Wm² at 340 nm employed, black panel temperature=63° C. (theoretical maximum temperature, wet bulb depression=10° C., conditioning water=30° C., weathering cycle=102 minutes light/18 minutes water, time of test=1000 hours. The ultimate tensile strength (UTS) of the film was measured (kgmm²) after testing and expressed as a percentage of the original value.

The invention is further illustrated by reference to the following examples.

EXAMPLE 1

Separate streams of a substrate layer polymer of polyethylene terephthalate comprising 1.1% by weight, relative to the weight of polyethylene terephthalate, of silica having a volume distributed median particle diameter of 6 μm, and 1% by weight, relative to the weight of polyethylene terephthalate, of Tinuvin 1577 FF (2-(4,6-diphenyl-1,3,5-triazin-2-yl)-5-(hexyl)oxyphenol, supplied by Ciba-Geigy) and a heat-sealable layer polymer comprising a copolyester of 82 mole % ethylene terephthalate and 18 mole % ethylene isophthalate were supplied from separate extruders to a single channel coextrusion assembly. The polymer layers were extruded through a film-forming die onto a water cooled rotating, quenching drum to yield an amorphous cast composite extrudate. The cast extrudate was heated to a temperature of about 80° C. and then stretched longitudinally at a forward draw ratio of 3.2:1. The composite sheet was passed into a stenter oven, where the sheet was dried and stretched in the sideways direction to approximately 3.4 times its original dimensions. The biaxially stretched composite sheet was heat set at a temperature of about 225° C. Final film thickness of the polymeric film was 30 μm. The polyester film substrate layer was 25 μm thick, and the heat-seatable layer was 5 μm thick.

The polymeric film was subjected to the test procedures described herein and exhibited the following properties:

(i) Wide angle haze = 67%
(ii) 60° gloss value = 43%
(iii) Root mean square roughness (Rq) = 700 nm
(iv) Heat-Seal Strength = 400 Nm$^{-1}$
(v) % Ultimate Tensile Strength (UTS) value after weathering = 72%

The polymeric film was laminated, on a standard coil-coating line, to a painted metal sheet by means of the heat-sealable layer being in contact with the painted surface of the metal sheet. The laminated metal sheet was particularly suitable for use as outdoor cladding for buildings.

EXAMPLE 2

This is a comparative example not according to the invention. The procedure of Example 1 was repeated except that no Tinuvin 1577 FF was present in the film.

The polymeric film was subjected to the test procedure described herein and exhibited the following property:
(v) % Ultimate Tensile Strength (UTS) value after weathering=0%

The polymeric film, when laminated to a metal sheet, was not suitable for use as outdoor cladding for buildings.

EXAMPLE 3

The procedure of Example 1 was repeated except that the substrate layer comprised 1500 ppm of china clay having a volume distributed median particle diameter of 0.8 μm, instead of silica.

The polymeric film was subjected to the test procedures described herein and exhibited the following properties:

(i) Wide angle haze = 5.5%
(ii) 60° gloss value = 160%
(iii) Root mean square roughness (Rq) = 90 nm
(iv) Heat-Seal Strength = 400 Nm$^{-1}$
(v) % Ultimate Tensile Strength (UTS) value after weathering = 87%

The polymeric film was laminated to the painted surface of a metal sheet. The laminated metal sheet was also suitable for use as outdoor cladding for buildings.

What is claimed is:

1. A polymeric film comprising a polyester film substrate comprising in the range from 0.1 to 10% by weight, relative to the weight of the polyester, of at least one UV absorber, and a heat-sealable layer on a surface of the substrate wherein the substrate is a multilayer film having an outer substrate layer and an inner substrate layer, the inner substrate layer comprising in the range from 1% to 40% by weight of UV absorber, relative to the amount of UV absorber present in the outer substrate layer.

* * * * *